United States Patent
Subhedar et al.

(10) Patent No.: US 12,299,690 B2
(45) Date of Patent: May 13, 2025

(54) SYSTEMS AND METHODS FOR TRACKING, PREDICTING, AND MITIGATING ADVANCED PERSISTENT THREATS IN NETWORKS

(71) Applicant: Ciena Corporation, Hanover, MD (US)

(72) Inventors: Sachin Subhedar, Alpharetta, GA (US); Roger Michael Elbaz, Alpharetta, GA (US); Aung Htay, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 1486 days.

(21) Appl. No.: 16/552,434

(22) Filed: Aug. 27, 2019

(65) Prior Publication Data

US 2019/0385167 A1    Dec. 19, 2019

Related U.S. Application Data

(63) Continuation of application No. 14/684,507, filed on Apr. 13, 2015, now Pat. No. 10,438,207.

(51) Int. Cl.
*G06Q 20/40* (2012.01)
*H04L 9/40* (2022.01)
*H04L 47/2483* (2022.01)

(52) U.S. Cl.
CPC ....... *G06Q 20/405* (2013.01); *G06Q 20/4016* (2013.01); *H04L 63/1408* (2013.01); *H04L 47/2483* (2013.01)

(58) Field of Classification Search
CPC .............. G06Q 20/405; G06Q 20/4016; H04L 63/1408; H04L 47/2483
USPC ........................................................ 705/44
See application file for complete search history.

(56) References Cited

U.S. PATENT DOCUMENTS

| | | | |
|---|---|---|---|
| 8,572,750 | B2 | 10/2013 | Patel et al. |
| 8,739,281 | B2 | 5/2014 | Wang et al. |
| 8,756,693 | B2 | 6/2014 | Dube et al. |
| 8,762,188 | B2 | 6/2014 | Abercrombie et al. |
| 9,160,761 | B2 | 10/2015 | Lee et al. |
| 2008/0167920 | A1 | 7/2008 | Schmidt et al. |
| 2008/0262991 | A1 | 10/2008 | Kapoor et al. |

(Continued)

OTHER PUBLICATIONS

Alex Biryukov, Deanonymisation of Clients in Bitcoin P2P Network, Jul. 4, 2015 (Year: 2014).*

(Continued)

*Primary Examiner* — Christine M Behncke
*Assistant Examiner* — Merritt J Hasbrouck
(74) *Attorney, Agent, or Firm* — Baratta Law PLLC; Lawrence A. Baratta, Jr.

(57) ABSTRACT

Systems and methods for tracking, predicting, and mitigating Advanced Persistent Threat (APT) attacks in a network include obtaining data related to events and triggers for one or more attacks, wherein the data includes a plurality of i) virtual currency transactions, ii) network traffic flow, and iii) sentiment on any of social media, blogs, and news feeds; correlating the data with one or more subscribed entities; determining a threat index for an attack on a specific subscribed entity of the one or more subscribed entities through analysis of the correlated data, wherein the threat index provides a probability of the attack on the specific subscribed entity; and notifying the specific subscribed entity of a likelihood of the attack based on the threat index.

15 Claims, 9 Drawing Sheets

(56) References Cited

U.S. PATENT DOCUMENTS

| | | | |
|---|---|---|---|
| 2009/0300589 A1* | 12/2009 | Watters | G06Q 40/00 |
| | | | 717/140 |
| 2011/0219035 A1 | 9/2011 | Korsunsky et al. | |
| 2012/0210434 A1 | 8/2012 | Curtis et al. | |
| 2012/0221485 A1* | 8/2012 | Leidner | G06Q 40/08 |
| | | | 705/36 R |
| 2012/0296845 A1 | 11/2012 | Andrews et al. | |
| 2013/0305357 A1 | 11/2013 | Ayyagarl et al. | |
| 2014/0115706 A1 | 4/2014 | Silva et al. | |
| 2014/0177450 A1 | 6/2014 | Chou et al. | |
| 2014/0370850 A1* | 12/2014 | Meacham | H04W 12/03 |
| | | | 455/410 |
| 2015/0063800 A1 | 3/2015 | Htay et al. | |
| 2015/0096024 A1 | 4/2015 | Haq et al. | |
| 2015/0341379 A1 | 11/2015 | Lefebvre et al. | |
| 2016/0005029 A1 | 1/2016 | Ivey et al. | |
| 2016/0021056 A1 | 1/2016 | Chesla | |
| 2016/0021061 A1 | 1/2016 | Nordstrom et al. | |
| 2016/0277447 A1 | 9/2016 | Pope et al. | |

OTHER PUBLICATIONS

Reid et al., "An Analysis of Anonymity in the Bitcoin System," 2011 IEEE International Conference on Privacy, Security, Risk, and Trust, and IEEE International Conference on Social Computing, 2011, pp. 1318-1326.

Montjoye et al., "Unique in the Crowd: The privacy bounds of human mobility," Scientific Reports, Published Mar. 25, 2013, pp. 1-5.

U.S. Patent and Trademark Miscellaneous Communication for U.S. Appl. No. 14/684,507 issuing a Notification Regarding Third-Party Preissuance Submission on Oct. 25, 2016.

* cited by examiner

SYSTEMS AND METHODS FOR TRACKING, PREDICTING, AND MITIGATING ADVANCED PERSISTENT THREATS IN NETWORKS

CROSS-REFERENCE TO RELATED APPLICATION(S)

The present disclosure claims priority to U.S. patent application Ser. No. 14/684,507, filed Apr. 13, 2015, and entitled "Systems and methods for tracking, predicting, and mitigating advanced persistent threats in networks," the contents of which are incorporated herein by reference.

FIELD OF THE DISCLOSURE

The present disclosure generally relates to networking systems and methods. More particularly, the present disclosure relates to systems and methods for tracking, predicting, and mitigating advanced persistent threats in networks.

BACKGROUND OF THE DISCLOSURE

Advanced persistent threats (APT) are stealthy and continuous computer hacking processes, often orchestrated by human(s) targeting a specific entity, organization, business, etc. For example, APTs usually targets organizations and/or nations for business or political motives. One example of an APT is a Distributed Denial of Service (DDoS) attack. APT processes require a high degree of covertness over a long period. The "advanced" process signifies sophisticated techniques using malware to exploit vulnerabilities in systems. The "persistent" process suggests that an external command and control system is continuously monitoring and extracting data from a specific target. The "threat" process indicates human involvement in orchestrating the attack. Disadvantageously, conventional mitigation strategies for APTs are reactive in nature. Conventional mitigation strategies include protection services that analyze traffic to detect APT attacks or routing traffic through third parties with large bandwidth mediums. For the protection services, an APT attack must be occurring for it to be detected. Also, these services can be expensive endeavors, such as if the protection services are bought as an emergency response to an unsuspected APT attack and last for an extended period. The third parties with large bandwidth mediums are used to mitigate APTs through an arms race approach—having excess capacity in hopes that the APT traffic does not exceed the bandwidth capabilities of the third party. In view of the foregoing, it would be advantageous to track proactively, predict and mitigate APTs.

BRIEF SUMMARY OF THE DISCLOSURE

In an exemplary embodiment, a non-transitory computer-readable medium includes instructions that, when executed, cause one or more processors to perform the steps of obtaining data related to events and triggers for one or more attacks, wherein the data includes i) virtual currency transactions, ii) Internet traffic flow, and iii) sentiment on any of social media, blogs, and news feeds; correlating the data with one or more subscribed entities; determining a threat index for an attack on a specific subscribed entity of the one or more subscribed entities through analysis of the correlated data, wherein the threat index provides a probability of the attack on the specific subscribed entity; and notifying the specific subscribed entity of a likelihood of the attack based on the threat index. The instructions that, when executed, can further cause the one or more processors to perform the steps of automatically causing mitigation of the attack based on the likelihood of the attack, wherein the mitigation include one or more actions which change operating parameters in the network relative to the specific subscribed entity.

The one or more actions can include causing an increase in network bandwidth for the specific subscribed entity, changing a service priority for the specific subscribed entity, and increasing service monitoring and increasing threat index monitoring for the specific subscribed entity. The instructions that, when executed, can further cause the one or more processors to perform the steps of de-anonymizing the virtual currency transactions, prior to the correlating, through one or more techniques to trace back the virtual currency transactions to systems originating/receiving the virtual currency transactions. The instructions that, when executed, can further cause the one or more processors to perform the steps of detecting a pattern between an originating addresses of the virtual currency transactions and destination addresses.

In another exemplary embodiment, a system includes a processor; and memory storing instructions that, when executed, cause the processor to obtain data related to events and triggers for one or more attacks, wherein the data includes i) virtual currency transactions, ii) Internet traffic flow, and iii) sentiment on any of social media, blogs, and news feeds, correlate the data with one or more subscribed entities, determine a threat index for an attack on a specific subscribed entity of the one or more subscribed entities through analysis of the correlated data, wherein the threat index provides a probability of the attack on the specific subscribed entity, and notify the specific subscribed entity of a likelihood of the attack based on the threat index.

In a further exemplary embodiment, a method includes obtaining data related to events and triggers for one or more attacks, wherein the data includes i) virtual currency transactions, ii) Internet traffic flow, and iii) sentiment on any of social media, blogs, and news feeds; correlating the data with one or more subscribed entities; determining a threat index for an attack on a specific subscribed entity of the one or more subscribed entities through analysis of the correlated data, wherein the threat index provides a probability of the attack on the specific subscribed entity; and notifying the specific subscribed entity of a likelihood of the attack based on the threat index.

In an exemplary embodiment, a computer-implemented method for tracking, predicting, and mitigating Advanced Persistent Threat (APT) attacks in a network includes detecting, from monitoring, events related to one or more subscribed entities, wherein the monitoring includes two or more of analyzing traffic flow, analyzing virtual currency transactions, and monitoring information related to the one or more subscribed entities on the Internet; analyzing the events to determine a likelihood of an attack on a specific subscribed entity of the one or more subscribed entities; and causing mitigation of the attack based on the determined likelihood, wherein the mitigation includes one or more actions in the network relative to the specific subscribed entity. The events can be detected based on historical analysis of previous APT attacks. The determined likelihood can be reflected by a threat index which provides a probability of the attack on the specific entity based on the analyzing of the events. The threat index can be a weighted average of the events including virtual currency transaction events correlated to sentiment on social media, blogs and news feeds. The monitoring information can be performed by gateways configured to detect sentiment related to the one or more subscribed entities on any of social media, Internet Relay Chat (IRC) rooms, news feeds or blogs, virtual currency transactions, and mobile communications. The analyzing can include correlating virtual currency transactions with other detected events. The virtual currency transaction analysis can include de-anonymizing virtual currency transactions through one or more techniques to trace back the virtual currency transactions. The one or more actions can include causing an increase in network bandwidth for the specific subscribed entity during times where there is the determined likelihood of the attack. The one or more actions can include changing a service priority for the specific subscribed entity during times where there is the determined likelihood of the attack. The one or more actions can include increasing service monitoring and increasing threat index monitoring for the specific subscribed entity during times where there is the determined likelihood of the attack.

In another exemplary embodiment, a system configured to track, predict, and mitigate Advanced Persistent Threat (APT) attacks in a network includes a processor; and memory storing instructions that, when executed, cause the processor to detect, based on data from a monitoring system, events related to one or more subscribed entities, wherein the monitoring system includes two or more of traffic flow analysis, virtual currency transaction analysis, and an information monitoring system related to the one or more subscribed entities on the Internet, analyze the events to determine a likelihood of an attack on a specific subscribed entity of the one or more subscribed entities, and cause mitigation of the attack based on the determined likelihood, wherein the mitigation includes one or more proactive actions in the network relative to the specific subscribed entity. The events can be detected based on historical analysis of previous APT attacks. The determined likelihood can be reflected by a threat index which provides a probability of the attack on the specific entity based on the analysis of the events. The threat index can be a weighted average of the events including virtual currency transaction events correlated to sentiment on social media, blogs and news feeds. The monitoring information can be performed by gateways configured to detect sentiment related to the one or more subscribed entities on any of social media, Internet Relay Chat (IRC) rooms, news feeds or blogs, virtual currency transactions, and mobile communications. The events can be analyzed to correlate virtual currency transactions with other detected events. The virtual currency transaction analysis can include de-anonymizing virtual currency transactions through one or more techniques to trace back the virtual currency transactions. The one or more proactive actions can include one or more of causing an increase in network bandwidth for the specific subscribed entity during times where there is the determined likelihood of the attack, changing a service priority for the specific subscribed entity during times where there is the determined likelihood of the attack, or increasing service monitoring and increasing threat index monitoring for the specific subscribed entity during times where there is the determined likelihood of the attack. The system can be implemented in a Software Defined Networking (SDN) environment.

In a further exemplary embodiment, a non-transitory computer-readable storage medium is described for tracking, predicting, and mitigating Advanced Persistent Threat (APT) attacks in a network. The non-transitory computer-readable storage medium stores software instructions that, when executed, cause a processor to perform the steps of detecting, from monitoring, events related to one or more subscribed entities, wherein the monitoring includes two or more of analyzing traffic flow, analyzing virtual currency transactions, and monitoring information related to the one or more subscribed entities on the Internet; analyzing the events to determine a likelihood of an attack on a specific subscribed entity of the one or more subscribed entities; and causing mitigation of the attack based on the determined likelihood, wherein the mitigation includes one or more actions in the network relative to the specific subscribed entity.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 is a block diagram of a server such as for the implementing various components of the system of FIG. 1, the APT prediction and mitigation process of FIG. 6, and the like.

DETAILED DESCRIPTION OF THE DISCLOSURE

In various exemplary embodiments, systems and methods are described for tracking, predicting APTs in networks. Optionally, the systems and methods can include a Software Defined Networking (SDN) application. The systems and methods capture events, and perform analysis and correlation to construct a decision tree that is used to derive a threat index from the perspective of a specific entity (i.e., a corporation, government, organization, group, individual, etc.). The captured events can be from Internet traffic flow analysis, virtual currency transaction analysis, social media analysis, and the like. In an exemplary embodiment, the systems and methods can de-anonymize crypto-currency, i.e., trace back the crypto currency to system originating/receiving the transaction, and correlate these events with monitoring of individuals mobility data and social media analysis. The decision tree can be used to calculate a threat index in real time from the perspective of subscribed entities and determine the probability of attack. This can in turn trigger actions to mitigate attacks, including, but not limited to, increasing network bandwidth for the duration of an anticipated attack, reevaluating service priority to be more sensitive to response times, increasing service monitoring for the duration of an anticipated attack, increasing threat index monitoring and searching for more decision points, and the like.

Advantageously, the systems and methods propose a holistic approach to predicting and mitigating APTs, providing a more effective approach to predict APTs attacks on specific targets. The systems and methods can proactively monitor network traffic using decision trees, social media monitoring, sentiment analysis, and associated correlation with virtual currency. In the context of SDN or the like, bandwidth-on-demand applications can monitor network usage and increase bandwidth, if necessary, during periods where there is a high probability of attack to mitigate service disruptions due to the APT attack. Also, the systems and methods can continuously track past and current APTs for a continuous re-evaluation of the threat index for subscribed entities. The systems and methods contemplate learning how current APTs are executed, for future integration into the threat index and decision tree determinations.

Figure 1:
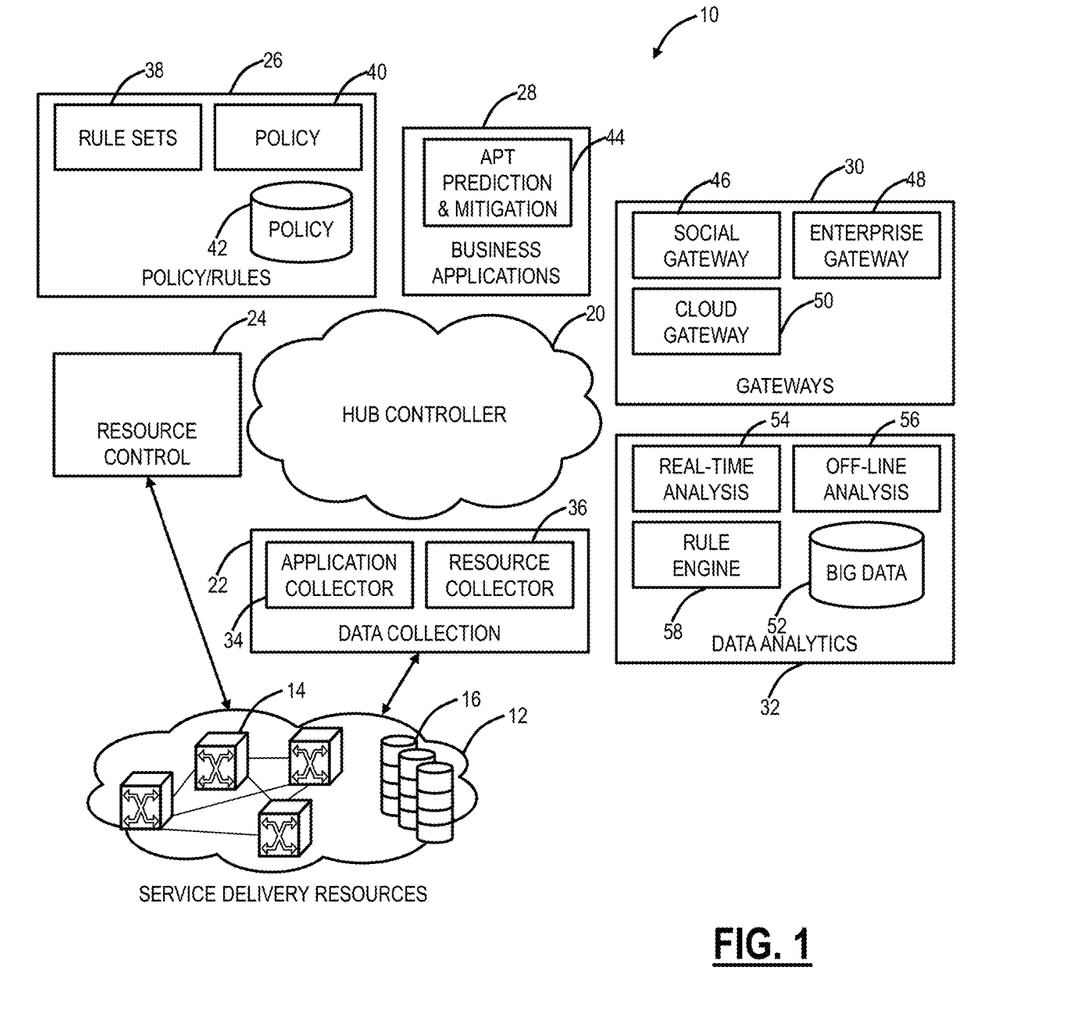
FIG. 1 is a network diagram of a system for tracking, predicting, and mitigating APTs in a network or collection of networks.

Referring to FIG. 1, in an exemplary embodiment, a network diagram illustrates a system 10 for tracking, predicting, and mitigating APTs in a network 12 or collection of networks. The network 12 (or collection of networks) includes various network elements 14, data resources 16, and the like, which can collectively be referred to as service delivery resources. That is, the network 12 provides connectivity for users at various layers, such as Layers 0 (photonic), 1 (time-division multiplexing), 2 (packet), 3 (Internet Protocol), and/or 4-7 (application). The network elements 14, data resources 16, etc. can include, without limitation, switches, routers, packet/optical switches, storage devices, Wave Division Multiplexing (WDM) equipment, time division multiplexing (TDM) switches, and the like. The network 12 can include any type of wired/wireless network from the access layer to metro, regional, and long haul network layers. The network 12 can include the Internet, Wide Area Networks (WANs), Local Area Networks (LANs), Virtual LANs (VLANs), etc.

In an exemplary embodiment, the network 12 (or some portion thereof) is an SDN network, which includes an SDN controller with the ability to (logically) centrally program provisioning of forwarding in the network 12 in order for more flexible and precise control over network resources to support new services. Application Programmable Interfaces (APIs) provide programmatic communication between an SDN controller and either (i) specific applications or (ii) programmable network devices such as communication over Transaction Language-1 (TL-1) or Common Object Request Broker Architecture (CORBA) calls. OpenFlow (www.openflow.org) is an example implementation of a special OpenFlow interface from the SDN controller to programmable network devices (such as the network elements 14, the data resources 16, etc.). OpenFlow is described, for example, in the OpenFlow Switch Speciation, Version 1.1.0 (February 2011)—Version 1.3.0 (June 2012), the contents of which are incorporated by reference herein. While OpenFlow describes one version of an SDN interface, other SDN protocols besides OpenFlow (such as Nedlow, REST, etc.) are also contemplated with the systems and methods described herein. Other types of networks besides SDN are also contemplated herein.

In various exemplary embodiments described herein, the system 10 monitors data associated with the network 12 and provides notification and/or mitigation to specific entities using the network 12 based on predictions of APTs. In general, for the system 10, the network 12 is where physical data is traversing as well as where a specific entity using the system 10 can adjust operating parameters of the network 12 based on APT predictions. The system 10 is communicatively coupled to the network 12. Various functional/logical components are now described in the system 10. The system 10 includes a hub controller 20, data collection 22, resource control 24, policy/rules 26, business applications 28, gateways 30, and data analytics 32. Note, while these functional/logical components may be described separately, they may be realized in various different manners.

For example, in one exemplary embodiment, the system 10 is an SDN application operating on or in communication with an SDN controller. In another exemplary embodiment, the system 10 is implemented in the hub controller 20 which may be implemented on one or more servers or in a cloud-based implementation. In another exemplary embodiment, the some or all of various functional/logical components 22, 24, 26, 28, 30, 32 may be integrated in the SDN controller or the hub controller 20. In other embodiments, the functional/logical components 22, 24, 26, 28, 30, 32 are realized in separate devices that are communicatively coupled to the SDN controller or the hub controller 20. Those of ordinary skill in the art will recognize the system 10 contemplate various physical realizations which all fall within the spirit of the systems and methods described herein.

The hub controller 20 is configured to implement the systems and methods described herein. The hub controller 20 can be realized in one or more servers as well as a cloud service. The hub controller 20 is communicatively coupled to the functional/logical components 22, 24, 26, 28, 30, 32 and/or some or all of the functional/logical components 22, 24, 26, 28, 30, 32 are integrated in the hub controller 20. The data collection 22 includes an application collector 34 and a resource collector 36. The data collection 22 is configured to bring data into the system 10 from the network 12, i.e., data related to the operation of the network 12 as described herein. The resource control 24 is coupled to the network 12 and is configured to control aspects of the network 12 based on predictions of APTs. This includes implementing the mitigation strategies described herein.

The policy/rules 26 include rule sets 38, policies 40, and a policy database 42. Generally, the policy/rules 26 are used by the hub controller 20 to process and correlate various events (from the data collection 22, the gateways 30, and the data analytics 32) for performing APT prediction and mitigation. The business applications 28 include an APT prediction and mitigation module 44 which provides the decision tree analysis and prediction. In an exemplary embodiment, the business applications 28 are SDN applications. The gateways 30 include, for example, a social gateway 46, an enterprise gateway 48, a cloud gateway 50, etc. The gateways 30 are configured to monitor various activity as described herein and provide detected activity, relative to a subscribed entity, to the hub controller 20.

The data analytics 32 is configured to perform analysis and data mining, similar to the gateways 30, for big data 52. The data analytics 32 includes a real-time analysis module 54, an off-line analysis module 56, and a rule engine 58 that cooperatively analyze and mine the big data 52. Note, the gateways 30 and the data analytics 32 both provide event information to the hub controller 20 related to a subscribed entity from the perspective of analyzing users and their activity in the network 12. The data collection 22 provides event information to the hub controller 20 related to activity detected at the service delivery resources, i.e., at the network elements 14, the data resources 16, etc.

Figure 2:
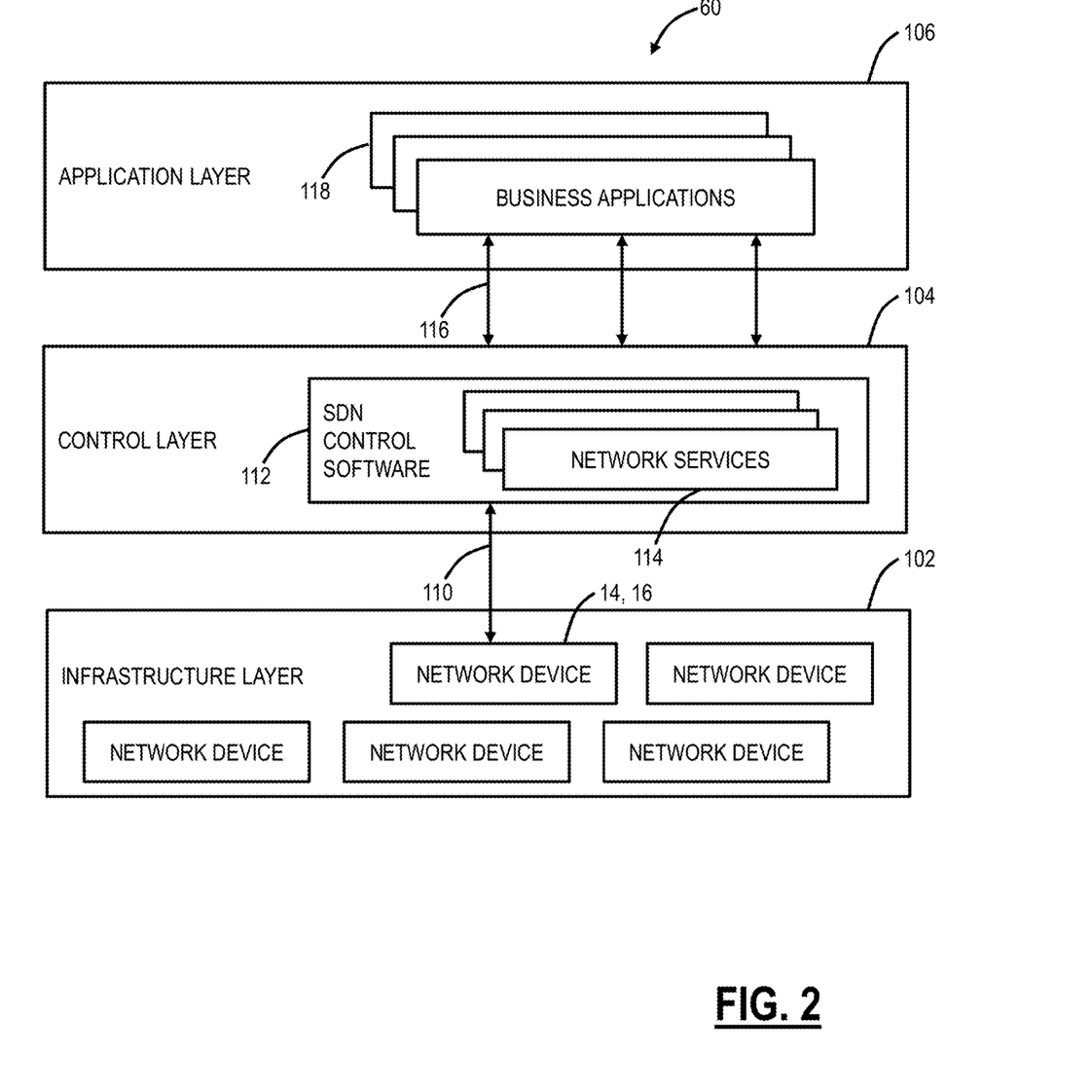
FIG. 2 is a block diagram of functional components of an SDN environment.

Referring to FIG. 2, in an exemplary embodiment, a block diagram illustrates functional components of the SDN environment 60. Again, as described herein, in an exemplary embodiment, the hub controller 20 can be an SDN controller which operates in the SDN environment 60. The SDN environment 60 includes a programmable infrastructure layer 102, a control layer 104, and an application layer 106. The programmable infrastructure layer 102 includes network devices such as the network elements 14, the data resources 16, and other components in the network 12 and is communicatively coupled to the control layer 104 via a control plane interface 110 such as OpenFlow, for example. The control layer 104 facilitates communication between the application layer 106 and the network devices located in programmable infrastructure layer 102. The control layer 104 includes SDN control software 112 with a plurality of network services 114. The control layer 104 provides SDN functionality to manage network services through the abstraction of lower level functionality. The application layer 106 communicates with the control layer 104 through various Application Programming Interfaces (APIs) 116. The application layer 106 provides end user connectivity to the SDN such as software modules and/or functions responsible for creating desired path and flow connections on the physical network through various business applications 118.

In an exemplary embodiment, the systems and methods described herein are implemented as one of the business applications 118 on the SDN environment 60 and/or on a separate server. The business applications 28 can be the same as the business applications 118. In the context of the systems and methods described herein, the SDN environment 60 and associated applications thereon are continually monitoring Operations, Administration, Monitoring (OAM) and performance monitoring data over time in the network 12. The systems and methods take advantage of the SDN paradigm to access relevant network data through open Application Programming Interfaces (APIs) such as associated with the SDN environment 60. In addition to accessing the network data, the hub controller 20 can also access data from the gateways 30 and the data analytics 32 via their APIs.

Figure 3:
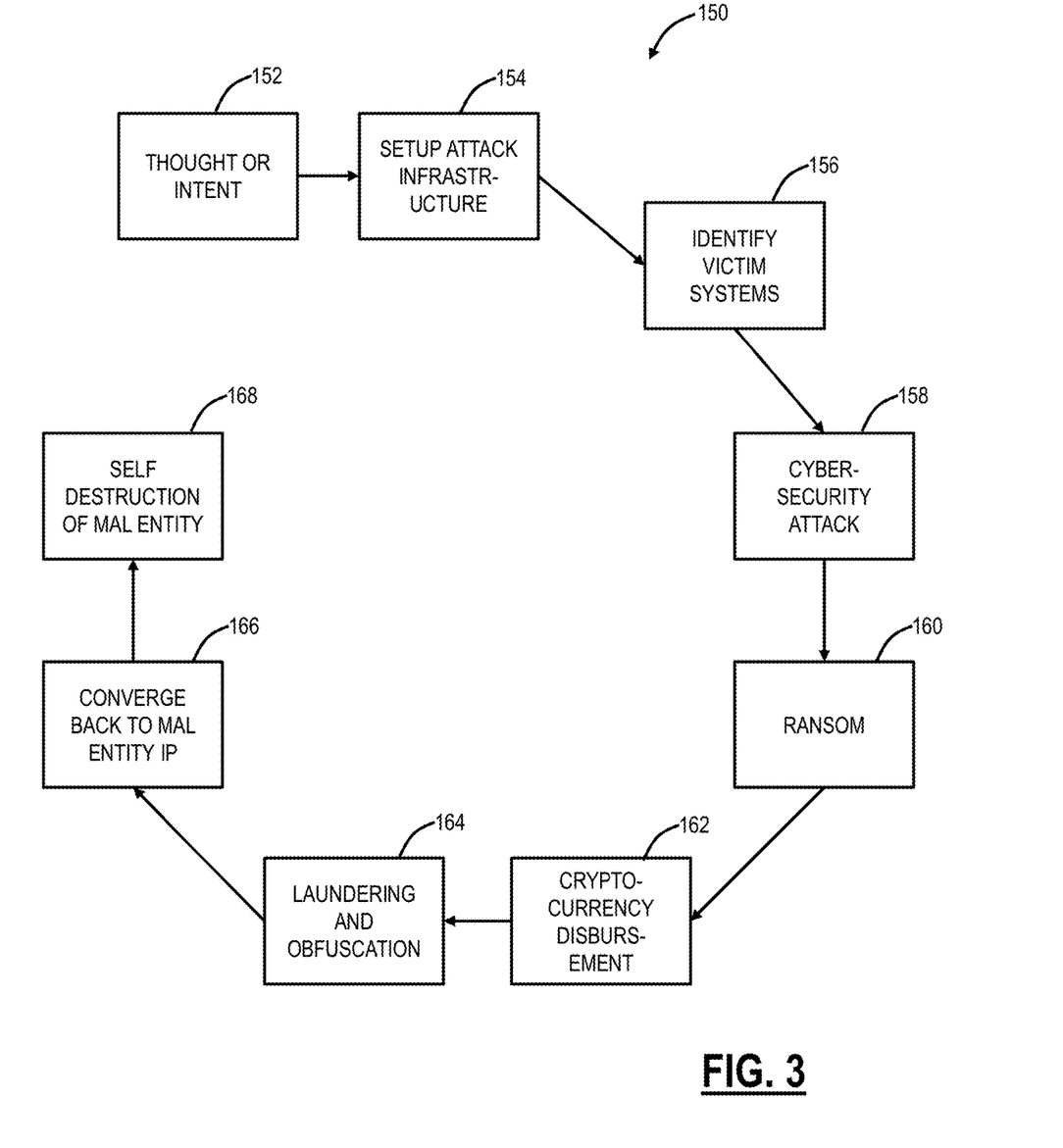
FIG. 3 is a flow diagram of exemplary activity associated with an attack.

Referring to FIG. 3, in an exemplary embodiment, a flow diagram illustrates exemplary activity associated with an attack 150. The attack 150 is shown for illustration purposes for a sample APT attack and those of ordinary skill in the art will recognize that all attacks will go through some or all of the stages in the attack 150, regardless of whether the motive behind the attack 150 is monetary or not. For example, the attack 150 can be referred to as a cyber-security ransomware or mule-ware attack. The first stage includes thought or intent (stage 152) where the thought, purpose, or intent of the attack 150 is determined. The attack intent is based on a goal set by an attacker, whether it is for monetary gain, cyber activism, an ideological purpose or the like. Also, the attack intent can be made public or kept private. If made public, the system 10 may be able to detect rumblings of the attack 150 such as through postings, solicitations, threats, etc. via the gateways 30.

Next, the attack infrastructure is set up (stage 154). Examples may include black market imports, renting zombies/bots, etc. Here, there is gathering support, such as through social media, and the attack infrastructure is set up. The attack infrastructure determines how effective the attack 150 is. This is important to note, as the attack infrastructure will affect not only an attack target, but also the effectiveness of the attack 150. In many hacktivist-driven attacks, the majority of the machines used in a Distributed Denial of Service (DDoS) attack will be volunteered and driven by individuals of a cause. In private, non-announced attacks, attackers may choose to bid for an infected machine network (botnet) from an individual or group who was responsible for infecting the machines. Depending on the investment made, an attack may or may not be successful to the end for which it was fabricated. As an example, if a private attacker only spends gives a 20$ investment for a monetary gain of 200$ in ransom, his/her investment may only qualify for 5 bots for an hour, and may not convince his/her target to pay a ransom (the attack 150 may not even congest the target's network).

The next stage includes identifying victim systems (stage 156). This can include victim intimidation. The manner to which a victim or target, is intimidated plays a role in determining attack methodology. Targets may be warned of the attack 150 to justify a premature ransom payment, or as a challenge to a target's authority and credibility. Targets may never receive a warning, and, as a result, may never set up a defensive infrastructure. During the attack 150, targets may scramble to make ransom payments and then set up a defensive infrastructure following an attack. Such was the case for the Swansea, Massachusetts Police Department (see www.networkworld.com/article/2225851/security/police-set-poor-example-by-paying-750-cryptolocker-ransom.html). The next stage may include the actual cyber-security attack (step 158).

The attack 150 can include ransom demands (stage 160). Enterprises face and will continue to face cyber security threats, such as APTs. The types of attacks include Ransomware (such as CrytoLocker), Extortionware and Muleware (attackers pay insiders for a role in attacks). Ransomware is malware which restricts access to the computer system that it infects and demands a ransom paid to the creator(s) of the malware in order for the restriction to be removed. Extortionware is an expansion on ransomware whereby unless you pay a certain amount to the attacker, the data will be made public for all to see (or for more targeted disclosure). Muleware solicits the participation of the user and offers them incentives to play a role in the attack 150. The motivation for these attacks can be summarized in following groups monetary payment (Ransomware, Extortionware, Muleware) or non-monetary payment (nuisance value (embarrassing, bad publicity for victims) or "Hacktivism"). The attack 150 thus can include crypto-currency disbursements (stage 162) such as for the ransom, for the payments to participating users, etc.

The attack 150 can include laundering and obfuscation (step 164) for covering tracks. For example, ransom payments may be shredded and disbursed at random intervals to cover up any obvious signs of connection to the attack. However, there is an inherent lack of trust that can be exploited. This lack of a trust ensures that payment is received 'soon-after' the attack, if not immediate. If obfuscation is necessary, a tumbler may be used. A tumbler disperses payments through multiple accounts and then converges them back on a single account (attacker) (stage 166). While using a tumbler, money is going to the same place eventually. Examples may include Bitcoin tumbler, bitcoin fog, mixing services, etc. It is possible to track the path where other transactions are going by sending in a 'fingerprint' Bitcoin through the tumbler that can leach on to other 'illicit' transactions. Finally, the attack 150 ends with the self-destruction of the malicious (mal) entity (stage 168).

At several points in the attack 150, there are event triggers that can be listed as—

1. Possible cyber-currency transaction in setup (this is valid in both types of attacks (monetary and non-monetary), i.e., even though, the ultimate objective may not be monetary, infrastructure still needs to be setup);
2. Negative public sentiment and ramping up of activities in social media;
3. Similar triggers in the past that led up to DDoS attacks on other entities;
4. Plausibility of an attack based on proof that mal-entities have the means and motivation to carry out the attack; and
5. Cyber-currency transaction occurred in the past that can be linked to the attacker or victim.

With the advanced use of Internet technologies, such attacks gather momentum over a period of several days to weeks. Previously, dedicated resources to monitor and track activities that can lead up to a cyber-attack are an expensive proposal for even a large sized corporation. The outcome of such attack ranges from embarrassment, financial (www.sc-magazine.com/incapsula-found-the-of-ddos-attacks-to-be-substantial/article/383179/) and credibility loss to business closure and loss of life and property. As such, the seriousness of these threats has increased significantly.

Recent cyber-security attacks from various groups were observed at different stages and the decision points they triggered. A survey of DDoS attacks performed by Kaspersky Lab (press.kaspersky.com/files/2014/11/B2B-International-2014-Survey-DDoS-Summary-Report.pdf) found that DDoS attacks cost significantly in the long term, more for small-to-medium-sized businesses than larger enterprises. Long term costs include managing sophisticated IT security staff, damage to company's reputation, credit rating, increased insurance premiums in addition to diminished service during the attack. Also, online public-facing services are most likely to be victims of DDoS attacks, and certain business sectors are more vulnerable, such as IT/Technology, E-commerce and Telecom, Media, etc.

In various exemplary embodiments, the system 10 is specifically tailored to look for specific events or triggers relative to a specific entity (or whoever is subscribed to the system 10). The attack 150 is described to reference exemplary events or triggers which are seen in the lead up to the actual attack. That is, the system 10 can include an application such as the APT prediction and mitigation module 44 that can predict a cyber-security attack for a commercial or non-commercial entity based on the nature of its business, current global events, social network activity and historical actions of parties involved, through the various components of the system 10. Monetary payments completed using virtual currency transactions are transmitted through the network and if it touches the network 12, the system 10 can do analytics, find a correlation between the triggers and predict cyber security attacks. It is possible to feed these predictions to a different service scheduling SDN app, i.e., through the resource control 24, that can increase bandwidth to mitigate damage in addition to other strategies.

Figure 4:
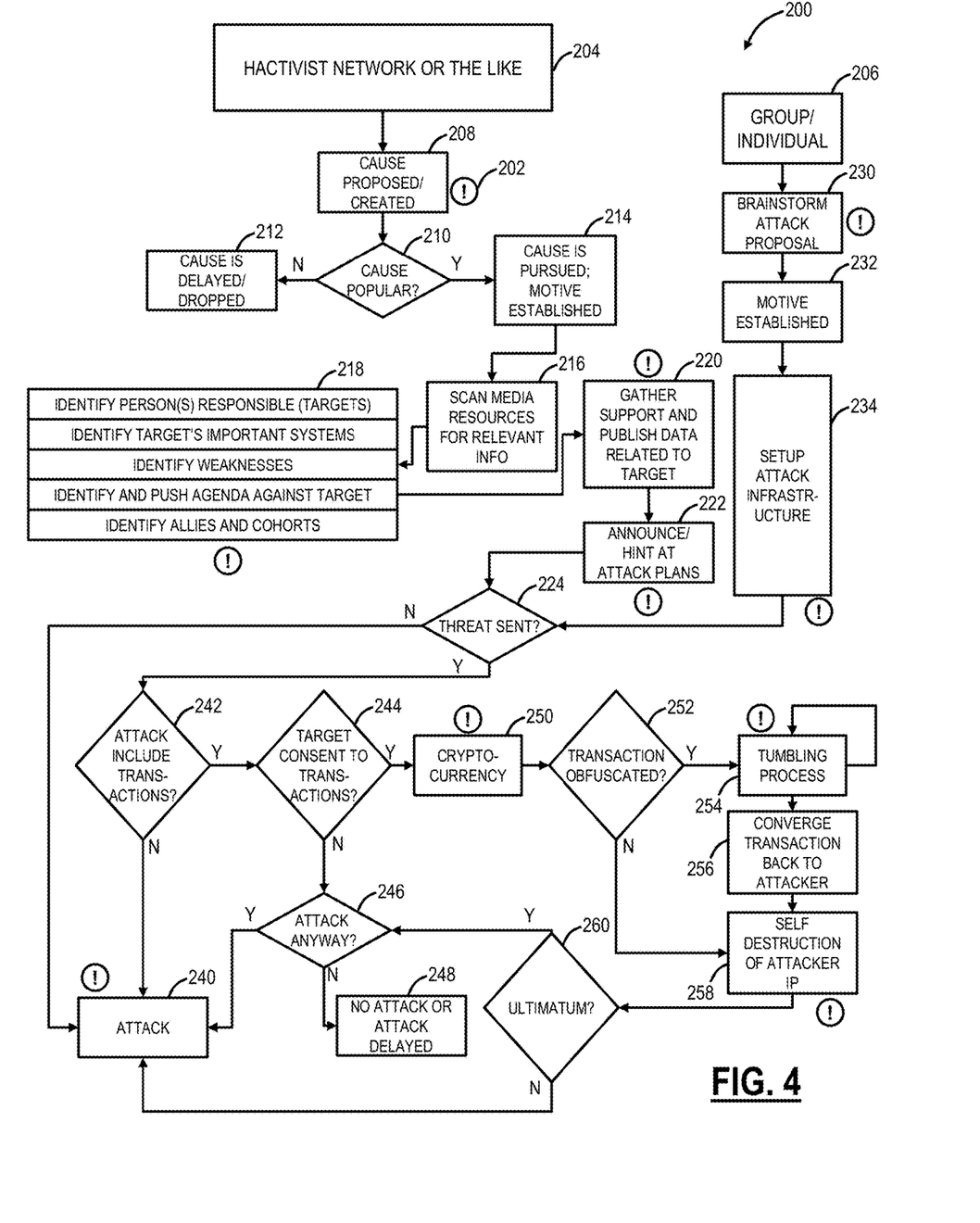
FIG. 4 is a flow chart of an attack with various identifiable events/triggers through the system of FIG. 1.

Referring to FIG. 4, in an exemplary embodiment, a flow chart illustrates an attack 200 with various identifiable events/triggers 202 through the system 10. The attack 200 can be initiated by a hacktivist network 204 or the like as well as by a group/individual 206. The flow chart illustrates the events/triggers 202 as the attack 200 unfolds. As described herein, the events/triggers 202 are crypto-currency transactions, social media feeds, or any other form of measurable action that can be detected by the data collection 22, the gateways 30, and/or the data analytics 32. For example, the events/triggers 202 can include possible virtual currency transactions as well as measurable action in events including but not limited to social media, blogs, chat rooms, news feeds in weeks/days leading up to the attack.

If the attack 200 is implemented by the hacktivist network 204, a cause is proposed or created (step 208) amongst the hacktivist network 204. This can lead to an identifiable event/trigger 202 which may be detected by the system 10. If the cause is not popular (step 210), the cause is delayed/dropped (step 212). If the cause is popular (step 210), the cause is pursued, and a motive is established (step 214). The hacktivist network 204 can scan media resources for relevant information (step 216) to identify various aspects for the attack 200 (step 218). The various aspects of the attack 200 can include identifying person(s) responsible (targets), identifying target's important systems, identifying weaknesses, identifying and pushing an agenda against the target, identifying allies and cohorts, etc. The various aspects of the attack can also lead to an identifiable event/trigger 202 which may be detected by the system 10.

Subsequently, the hacktivist network 204 can gather support and publish data related to the target (step 220) which can lead to an identifiable event/trigger 202 which may be detected by the system 10. The hacktivist network 204 can also announce or hint at the attack plans (step 222) which can lead to an identifiable event/trigger 202 which may be detected by the system 10. Next, the hacktivist network 204 can optionally send a threat (step 224). Back to the group/individual 204, the group/individual 204 can brainstorm an attack proposal (step 230) which can lead to an identifiable event/trigger 202 which may be detected by the system 10. The group/individual 204 can establish a motive (step 232) and set up attack infrastructure (step 234) which can lead to an identifiable event/trigger 202 which may be detected by the system 10. Next the group/individual 204 can optionally send a threat (step 224).

If no threat is sent (step 224), the attack can occur (step 240) which can lead to an identifiable event/trigger 202 which may be detected by the system 10. Again, the attack is an APT, which can include a DDoS, email reveals, database cracking, etc. If a threat is sent (step 224), the attack may involve transactions (i.e., ransom, etc.) (step 242). If not (step 242), the threat is sent to warn of the attack and the attack occurs (step 240) which can lead to an identifiable event/trigger 202 which may be detected by the system 10. If the attack involves transactions (step 242), it is determined if the target consents to the transactions (step 244). If not (step 244), the attack may or may not occur anyway (step 246). Here, the attack can occur (step 240) which can lead to an identifiable event/trigger 202 which may be detected by the system 10 or the attack does not occur or is delayed (step 248).

If the target consents to the transactions (step 244), there can be a crypto-current disbursement (step 250) which can lead to an identifiable event/trigger 202 which may be detected by the system 10. The crypto-current disbursement/transaction may or may not be obfuscated (step 252). If so (step 252), there is a tumbling process (step 254) which can lead to an identifiable event/trigger 202 which may be detected by the system 10, the transaction is converged back to the attacker (step 256) and there is a self-destruction of the attacker's IP (step 258) which can lead to an identifiable event/trigger 202 which may be detected by the system 10. If the crypto-current disbursement/transaction is not obfuscated (step 252), there is a self-destruction of the attacker's IP (step 258) which can lead to an identifiable event/trigger

202 which may be detected by the system 10. Finally, after the self-destruction, there can be an ultimatum based on the transactions (step 260).

In recent times, attacks have increasing used virtual or crypto currency to procure infrastructure for attack and disbursement of ransom amount. Crypto currency is a decentralized medium of exchange where each transaction is recorded and encrypted. Such transactions give an unprecedented level of anonymity to the parties involved. As a result, this exchange is becoming an attractive option in cyber security threats. The systems and methods propose these transactions to detect and predict cyber security threats such as ransomware, extortionware, and muleware. Whether the ultimate motive is monetary or not, each attack can be thought of having a life cycle of several stages as previously described. Again, each stage is marked by one or more 'events' or 'triggers' that can be measured by the system 10.

In an exemplary embodiment, the Bitcoin peer-to-peer payment system is considered. Each Bitcoin transaction is verified and marked in a public ledger known as block chain. Bitcoin is an online payment system. Addresses belong to an entity or person/Bitcoin wallet. There is a many-many relationship between entity and address. A Bitcoin transaction happens in a transaction block and can be traced back to the Internet Protocol (IP) address where the transaction originated. In several recent ransomware attacks, ransom payments were demanded and resulted in severe financial damage. The ransom payments were done using Bitcoin transaction. Bitcoin tumbler which acts as an automated money laundering system is frequently used to obfuscate such illegal transactions.

In Fergal Reid and Martin Harrigan's "An Analysis of Anonymity in the Bitcoin System" (arxiv.org/pdf/1107.4524.pdf?origin=publication detail) it is shown that it is possible to track obfuscated Bitcoin (crypto-currency) transactions. For example, in FIG. 1.12, Reid and Harrigan propose creating a graph of sub-networks for tracking obfuscated bitcoin transactions. Specifically, every Bitcoin transaction becomes an integral part of a transaction block and carries with it a trace. If a sufficiently large set of transaction blocks are analyzed around the time an attack and subsequent ransom payments take place, it is possible to detect a pattern between originating Bitcoin address (either directly a victim or its subsidiary) and destination address (one of the IPs belonging to perpetrator of a ransomware attack).

Detecting a pattern is a formidable task and with Bitcoin tumbler, the problem becomes manifold complex. However, the system 10 can exploit several factors in favor of identifying such a pattern as follows. First, any Bitcoin address that has sustained transactions over a significant period has a low probability of malicious behavior. Similarly, Bitcoin address that matches IP (or a group of IP) consistently over a period can also be sifted out as legitimate. Ransomware attack behavior is well documented and unsurprisingly typical. Transactions occur in short bursts, showing a lot of activity at the time of the attack. Ransom payments may be shredded and disbursed at random intervals to cover up any obvious signs of connection to the attack. However, there is an inherent lack of trust that can be exploited. This lack of a trust ensures that payment is received 'soon-after' the attack, if not immediate. Finally, a successful robbery spurs another one with a high probability of repeat behavior.

Some people shy away from using tumbler due to trust (fear of not getting money back). While using a tumbler, money is going to the same place eventually. It is possible to track the path where other transactions are going by sending in a 'fingerprint' Bitcoin through the tumbler that can leach on to other 'illicit' transactions. Also, there are a limited number of sites that offer crypto-currency laundering services and limited avenues for the attacker to spend Bitcoins finally. Further, the system 10 can include monitoring social media, forums for boasts or references to the attack.

Figure 5:
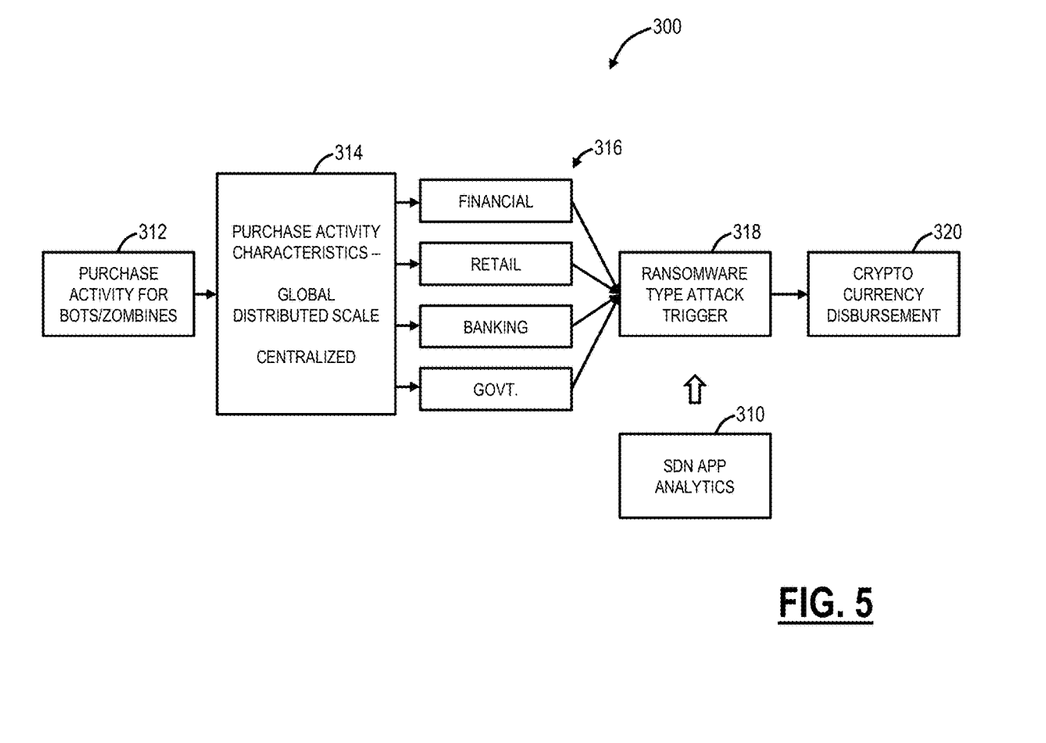
FIG. 5 is a block diagram of a modular view of a decision graph used to analyze crypto or virtual currency transactions.

Referring to FIG. 5, in an exemplary embodiment, a block diagram illustrates a modular view of a decision graph 300 used to analyze crypto or virtual currency transactions. In the system 10, an application 310 can perform Internet traffic flow analysis, de-anonymize crypto-currency (trace back the crypto currency to system originating/receiving the transaction), and correlate those events with monitoring of individuals mobility data and social media analysis exploiting the behavior pattern mentioned above. For example, in the decision graph 300, there is purchase activity such as for bots, zombies, etc. (step 312) with purchase activity characteristics (step 314) (e.g., global, distributed scale or centralized). This activity can be in various different areas—financial, retail, banking, government, etc. (step 316). There can be one or more attack triggers (step 318) which can be detected by the application 310, as well as detecting crypto-current disbursements (step 320). The results are then fed to an analytical engine that constructs a decision tree.

Figure 6:
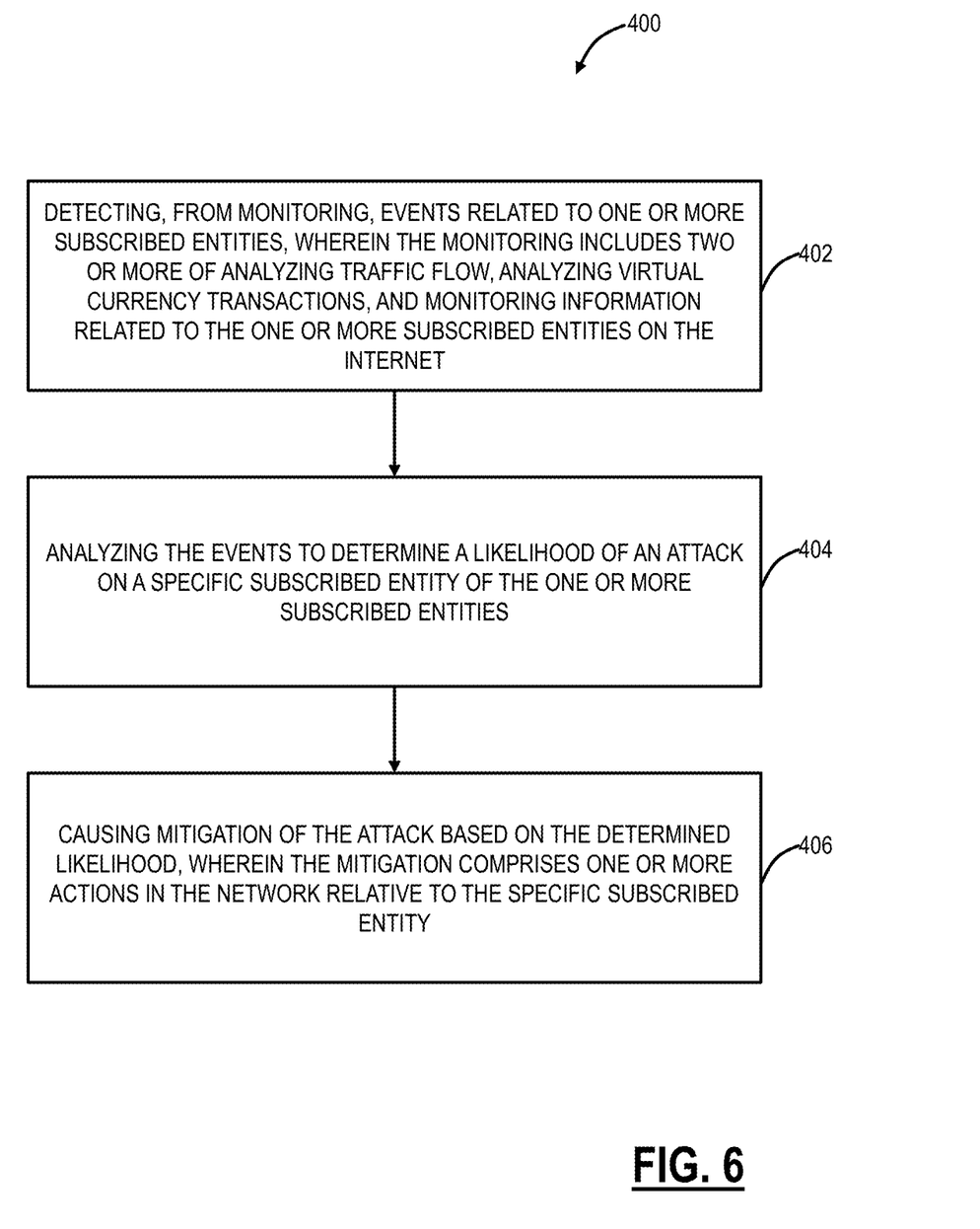
FIG. 6 is a flow chart of an APT prediction and mitigation process.

Referring to FIG. 6, in an exemplary embodiment, a flow chart illustrates an APT prediction and mitigation process 400. The APT prediction and mitigation process 400 contemplates the operation in the system 10, through the hub controller 20, through an SDN controller and/or application, or the like. The APT prediction and mitigation process 400 can be a computer-implemented method for tracking, predicting, and mitigating Advanced Persistent Threat (APT) attacks in a network. Also, the APT prediction and mitigation process 400 could be implemented in a system such as the hub controller 20 or any other server. The APT prediction and mitigation process 400 includes detecting, from monitoring, events related to one or more subscribed entities, wherein the monitoring includes two or more of analyzing traffic flow, analyzing virtual currency transactions, and monitoring information related to the one or more subscribed entities on the Internet (step 402). Traffic flow analysis looks at network-level data (e.g., traffic patterns, volumes, etc.) whereas monitoring looks at content-level data (e.g., Twitter, other social media data, etc.).

Specifically, the APT prediction and mitigation process 400 works in relation to identified entities, i.e. the one or more subscribed entities. These can be companies, enterprises, organizations, governments, individuals, etc. That is anyone or thing with computing resources that could come under attack. The events or triggers are related to the one or more subscribed entities, and can be any information that would relate to a potential APT attack to one of the one or more subscribed entities. Again, the events or triggers are determined from the ongoing monitoring, such as through the data collection 22, the gateways 30, and the data analytics 32. The events or triggers can be determined based on historical analysis of previous APT attacks, i.e. such as described herein in a typical attack flow in FIGS. 3 and 4. The APT prediction and mitigation process 400 can receive input from 1) a social media, enterprise gateway to gather Internet sentiment, 2) a cloud gateway to monitor and capture virtual currency transactions, 3) dig data storage for historical event and trend analysis, and 4) decision tree and Data Analytics for threat index (TI) calculation.

The APT prediction and mitigation process 400 includes analyzing the events to determine a likelihood of an attack on a specific subscribed entity of the one or more subscribed entities (step 404) and causing mitigation of the attack based on the determined likelihood, wherein the mitigation comprises one or more actions in the network relative to the specific subscribed entity (step 406). The determined likelihood can be reflected by a threat index which reflects a probability of the attack on the specific entity based on the analyzing and correlating of the related events or triggers. The threat index can be a weighted average of the events or triggers including virtual currency transaction events and sentiment on social media, blogs, and news feeds. The analyzing and correlating can be part of a decision tree determination where each new trigger or event is analyzed to adjust the determined likelihood—either to reduce or increase the determined likelihood.

For example, each trigger or event can be a decision point for the APT prediction and mitigation process 400 to narrow down a search area for additional triggers or events. Also, each trigger or event can lead to a re-computation of the threat index for an entity. The threat index is a weighted average of trigger actions including virtual currency transaction events, sentiment on social media, blogs, and news feeds among other attributes. The threat index can calculated in real time to follow the fluctuations of component values of trigger actions. For example, the threat index can be represented as an n-bit binary number with the order indicating the degree of importance.

In an exemplary embodiment, the threat index can have the following components:

| Social Media | Internet Relay Chat rooms | News sources, blogs | Virtual Currency transactions among monitored groups | Mobile communication data among monitored groups Service providers may only utilize this component with an established agreement providing anonymized mobile phone dataset. |
|---|---|---|---|---|

The gateways monitoring information are configured to detect sentiment related to the one or more subscribed entities on any of social media, Internet Relay Chat (IRC) rooms, news feeds or blogs, virtual currency transactions, and mobile communications. The analyzing and correlating can include correlating virtual currency transactions with the events or triggers. A unique aspect of the APT prediction and mitigation process 400 is the fact that virtual currency transaction analysis can be used to bolster other activity such as in social media or the like. This is used to separate Internet sentiment with little or no motivation to attack versus that which has backing. The virtual currency transaction analysis can include de-anonymizing virtual currency transactions by tracing back the virtual currency transactions to originating and receiving systems.

The one or more mitigation actions can include 1) causing an increase in network bandwidth for the specific subscribed entity during times where there is the determined likelihood of the attack, 2) changing a service priority for the specific subscribed entity during times where there is the determined likelihood of the attack, and/or 3) increasing service monitoring for the specific subscribed entity during times where there is the determined likelihood of the attack. Also, these actions can be changed as the threat index reduces over time.

The APT prediction and mitigation process 400 offers a solution to mitigating attacks that is proactive, rather than reactive. Again, the APT prediction and mitigation process 400 can be an SDN application that captures and performs Internet traffic flow analysis, de-anonymize crypto-currency (trace back the crypto currency to system originating/receiving the transaction), and correlates those events with a dynamically recalculating Threat Index (TI) that utilizes data mined from several entities, to include data publicly available through social media sites, individual mobility data (if applicable), Internet Relay Chat (IRC) rooms, Virtual currency transactions, News sources, Blogs, etc. The strength of the APT prediction and mitigation process 400 lies in the identification of trigger points using crypto currency transactions that happen during different stages of cyber-attacks, based on historical analysis, and performing analysis on trigger points on the decision tree to calculate probability for a specific industry group or an enterprise. The APT prediction and mitigation process 400 embedded in SDN application can then utilize this information to predict the future attack on subscribed entities that most closely match victims of cyber-attack.

Figure 7:
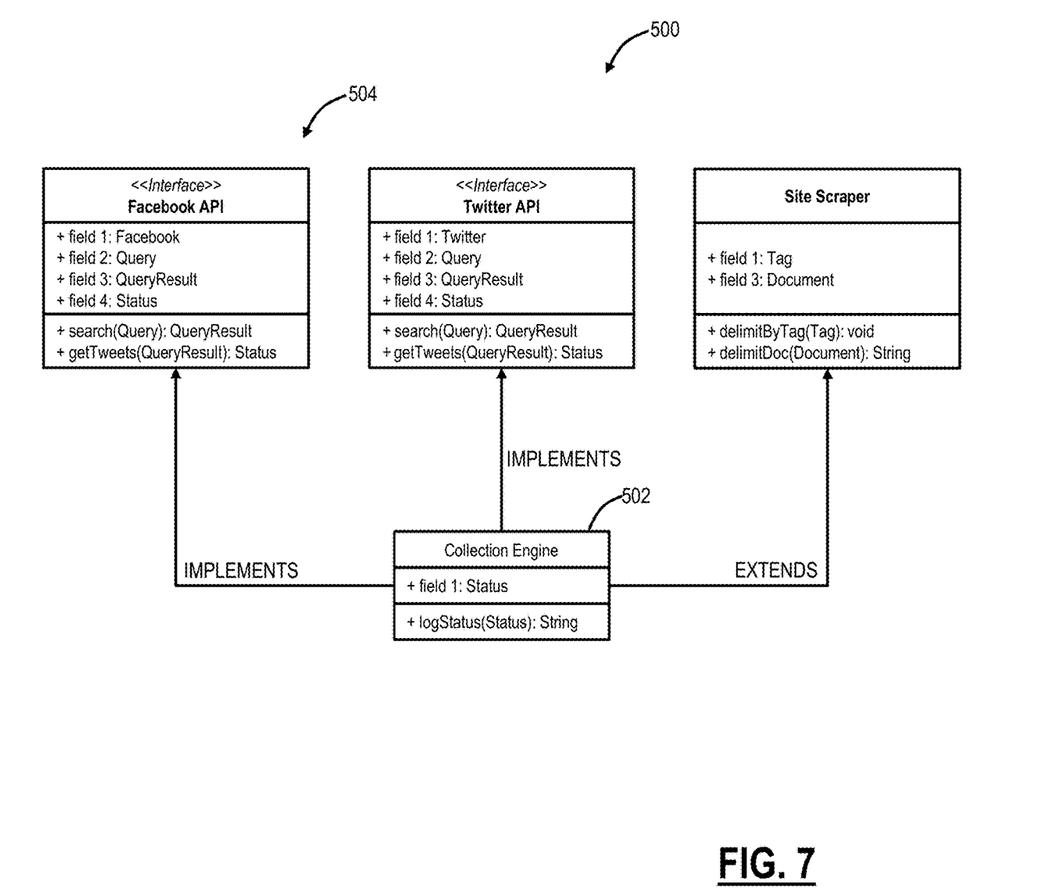
FIG. 7 is a logical diagram of data collection from social media.

Referring to FIG. 7, in an exemplary embodiment, a logical diagram illustrates data collection 500 from social media. As part, the APT prediction and mitigation process 400 and the system 10, a social media's API can be used for data collection, such as shown in FIG. 7. For example, a collection engine 502 which can be part of the gateways 30 or the like is configured to access social media APIs 504 to collect information about the subscribed entities. Twitter, Facebook, Instagram, etc. all provide public APIs to any developer willing to register an account. It should be noted that although using an API is an option, social media scanning is not limited to the use of APIs, and methods such as screen-scraping blogs or subscribing to blogs and feeds may be considered as well. Additionally, social media is not restricted to online resources, as television and radio may also be considered as public outlets.

Figure 8:
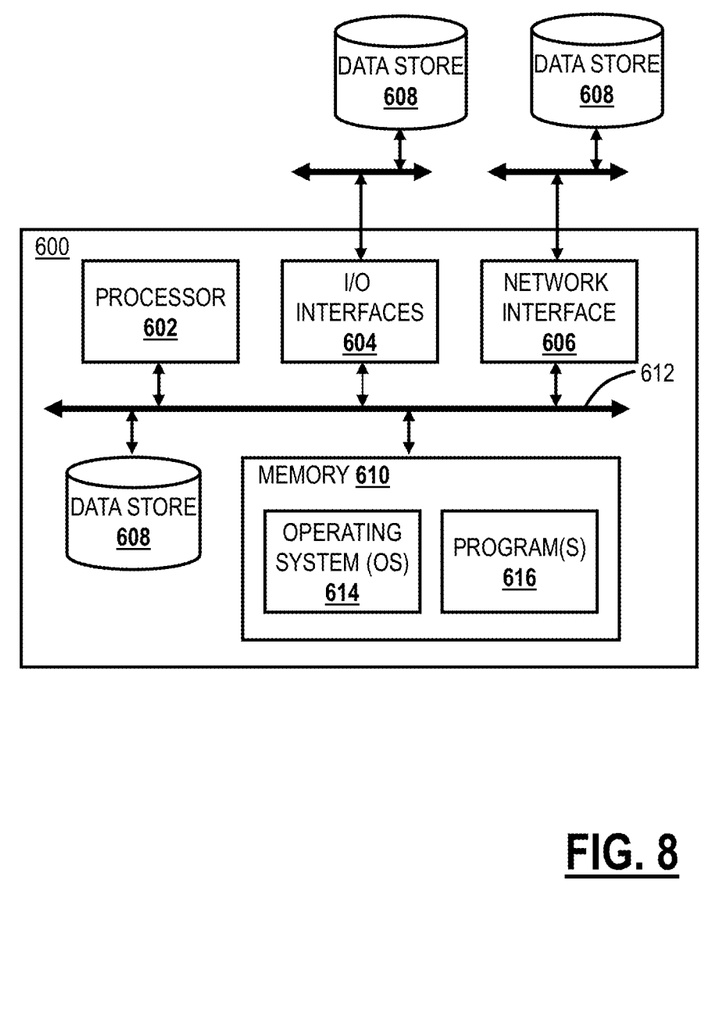

Referring to FIG. 8, in an exemplary embodiment, a block diagram illustrates a server 600 such as for the implementing various components of the system 10, the APT prediction and mitigation process 400, and the like. The server 600 can be a digital computer that, in terms of hardware architecture, generally includes a processor 602, input/output (I/O) interfaces 604, a network interface 606, a data store 608, and memory 610. It should be appreciated by those of ordinary skill in the art that FIG. 8 depicts the server 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 can include address, control, and/or data connections to enable appropriate communications among the aforementioned components.

The processor 602 is a hardware device for executing software instructions. The processor 602 can be any custom made or commercially available processor, a central processing unit (CPU), an auxiliary processor among several processors associated with the server 600, a semiconductor based microprocessor (in the form of a microchip or chip set), or generally any device for executing software instructions. When the server 600 is in operation, the processor 602 is configured to execute software stored within the memory

610, to communicate data to and from the memory 610, and to generally control operations of the server 600 pursuant to the software instructions. The I/O interfaces 604 can be used to receive user input from and/or for providing system output to one or more devices or components. User input can be provided via, for example, a keyboard, touchpad, and/or a mouse. System output can be provided via a display device and a printer (not shown). I/O interfaces 604 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 606 can be used to enable the server 600 to communicate on a network. The network interface 606 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 606 can include address, control, and/or data connections to enable appropriate communications on the network. A data store 608 can be used to store data. The data store 608 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 can incorporate electronic, magnetic, optical, and/or other types of storage media. In one example, the data store 608 can be located internal to the server 600 such as, for example, an internal hard drive connected to the local interface 612 in the server 600. Additionally in another embodiment, the data store 608 can be located external to the server 600 such as, for example, an external hard drive connected to the I/O interfaces 604 (e.g., SCSI or USB connection). In a further embodiment, the data store 608 can be connected to the server 600 through a network, such as, for example, a network-attached file server.

The memory 610 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 can incorporate electronic, magnetic, optical, and/or other types of storage media. Note that the memory 610 can have a distributed architecture, where various components are situated remotely from one another, but can be accessed by the processor 602. The software in memory 610 can include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic. Of course, a combination of the approaches above may be used. Moreover, some exemplary embodiments may be implemented as a non-transitory computer-readable storage medium having computer readable code or software stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Figure 9:
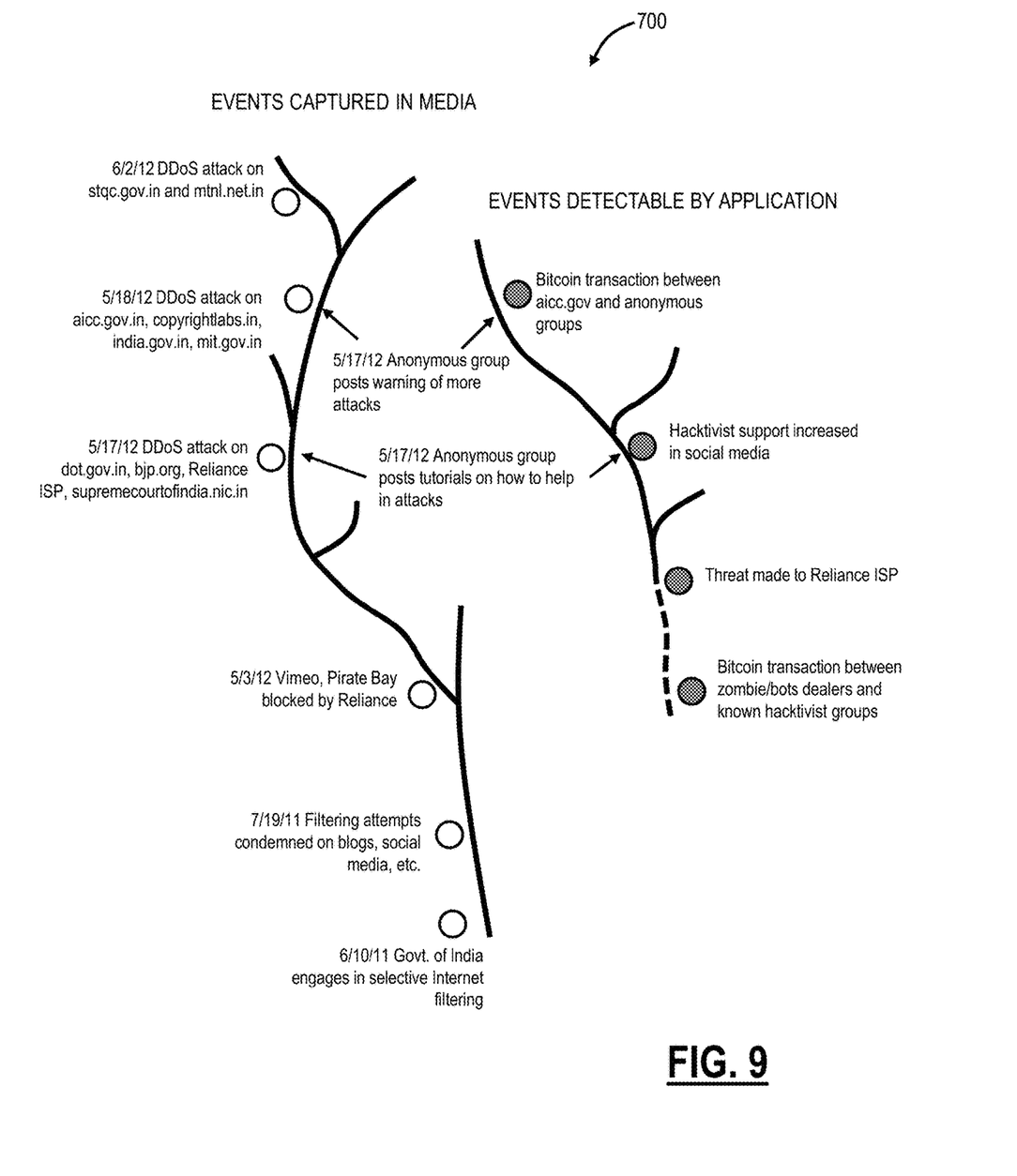
FIG. 9 is a decision tree of an example case study of a real attack.

Referring to FIG. 9, in an exemplary embodiment, a decision tree 700 illustrates an example case study of a real attack. The decision tree 700 relates to the Government of India's decision in 2011 imposes some degree of censorship on the Internet. The government of India was classified as engaged in selective Internet filtering in the political, conflict/security, social, and Internet tool areas in 2011. India's selective censorship of blogs and other content, often under the guise of security, was met with significant opposition. Indian ISPs continue to filter Web sites identified by authorities selectively. However, government attempts at filtering have not been entirely effective because blocked content has quickly migrated to other Web sites and users have found ways to circumvent filtering. In 2012, Hacktivist Group Anonymous, amongst other groups, sought to disturb Indian government and media operations through massive DDoS attacks and website defacement. This was conducted as a virtual protest against selective internet censorship, prefacing a later physical protest.

The decision tree 700 in FIG. 9 visualizes the triggers and events associated with this real attack. Events on the left are captured in the media, and events on the right could be detectable by the application. From the case study, trigger point events are consolidated and based on these trigger events, the decision tree 700 is generated to calculate the threat index in real time as shown in FIG. 9. For a sample subscribed entity, mtnl.net.in, threat index can be shown to increase as events match up the decision tree—

| Date | Threat Index |
| --- | --- |
| Jun. 10, 2011 | 6% |
| May 3, 2012 | 6% |
| May 17, 2012 | 12% |
| May 18, 2012 | 25% |
| May 19, 2012 | 50% |
| May 29, 2012 | 90+% |
| Jun. 2, 2012 | 90+% |

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby and are intended to be covered by the following claims.

What is claimed is:

1. A non-transitory computer-readable medium having instructions that, when executed, cause one or more processors to perform the steps of:
obtaining data related to events and triggers for one or more attacks, wherein the data includes a plurality of i) virtual currency transactions that includes crypto currency, ii) network traffic flow, and iii) sentiment on any of social media, blogs, and news feeds;
correlating the data with one or more subscribed entities;
determining a threat index for an attack on a computer system of a specific subscribed entity of the one or more subscribed entities through analysis of the correlated data, wherein the threat index provides a probability of the attack on the specific subscribed entity, and wherein the threat index is determined over time using the events and triggers;
notifying the specific subscribed entity of a likelihood of the attack based on the threat index; and
automatically causing mitigation of the attack based on the likelihood of the attack, wherein the mitigation include one or more actions which change operating parameters in the network relative to the specific subscribed entity.

2. The non-transitory computer-readable medium of claim 1, wherein the one or more actions include causing an increase in network bandwidth for the specific subscribed entity.

3. The non-transitory computer-readable medium of claim 1, wherein the one or more actions include changing a service priority for the specific subscribed entity.

4. The non-transitory computer-readable medium of claim 1, wherein the one or more actions include increasing service monitoring and increasing threat index monitoring for the specific subscribed entity.

5. The non-transitory computer-readable medium of claim 1, wherein the instructions that, when executed, further cause the one or more processors to perform the steps of
de-anonymizing the virtual currency transactions, prior to the correlating, through one or more techniques to trace the virtual currency transactions to systems that either originate or receive the virtual currency transactions.

6. A system comprising:
a processor; and
memory storing instructions that, when executed, cause the processor to
obtain data related to events and triggers for one or more attacks, wherein the data includes a plurality of i) virtual currency transactions that includes crypto currency, ii) network traffic flow, and iii) sentiment on any of social media, blogs, and news feeds,
correlate the data with one or more subscribed entities,
determine a threat index for an attack on a computer system of a specific subscribed entity of the one or more subscribed entities through analysis of the correlated data, wherein the threat index provides a probability of the attack on the specific subscribed entity, and wherein the threat index is determined over time using the events and triggers,
notify the specific subscribed entity of a likelihood of the attack based on the threat index, and
automatically cause mitigation of the attack based on the likelihood of the attack, wherein the mitigation include one or more actions which change operating parameters in the network relative to the specific subscribed entity.

7. The system of claim 6, wherein the one or more actions include causing an increase in network bandwidth for the specific subscribed entity.

8. The system of claim 6, wherein the one or more actions include changing a service priority for the specific subscribed entity.

9. The system of claim 6, wherein the one or more actions include increasing service monitoring and increasing threat index monitoring for the specific subscribed entity.

10. The system of claim 6, wherein the instructions that, when executed, further cause the processor to
de-anonymize the virtual currency transactions, prior to the correlating, through one or more techniques to trace the virtual currency transactions to systems that either originate or receive the virtual currency transactions.

11. A method comprising:
obtaining data related to events and triggers for one or more attacks, wherein the data includes a plurality of i) virtual currency transactions that includes crypto currency, ii) network traffic flow, and iii) sentiment on any of social media, blogs, and news feeds;
correlating the data with one or more subscribed entities;
determining a threat index for an attack on a computer system of a specific subscribed entity of the one or more subscribed entities through analysis of the correlated data, wherein the threat index provides a probability of the attack on the specific subscribed entity, and wherein the threat index is determined over time using the events and triggers;
notifying the specific subscribed entity of a likelihood of the attack based on the threat index; and
automatically causing mitigation of the attack based on the likelihood of the attack, wherein the mitigation include one or more actions which change operating parameters in the network relative to the specific subscribed entity.

12. The method of claim 11, wherein the one or more actions include causing an increase in network bandwidth for the specific subscribed entity.

13. The method of claim 11, wherein the one or more actions include changing a service priority for the specific subscribed entity.

14. The method of claim 11, wherein the one or more actions include increasing service monitoring and increasing threat index monitoring for the specific subscribed entity.

15. The method of claim 11, further comprising
de-anonymizing the virtual currency transactions, prior to the correlating, through one or more techniques to trace the virtual currency transactions to systems that either originate or receive the virtual currency transactions.

* * * * *